(12) United States Patent
Ferlitsch

(10) Patent No.: US 7,543,157 B2
(45) Date of Patent: Jun. 2, 2009

(54) SEGMENTED, ENCRYPTED PDL FOR POST-RENDERING ANALYSIS

(75) Inventor: Andrew R. Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 445 days.

(21) Appl. No.: 10/674,329

(22) Filed: Sep. 29, 2003

(65) Prior Publication Data

US 2005/0071654 A1 Mar. 31, 2005

(51) Int. Cl.
G06F 12/14 (2006.01)
(52) U.S. Cl. .................................... 713/189
(58) Field of Classification Search .................. None
See application file for complete search history.

(56) References Cited

U.S. PATENT DOCUMENTS

| | | | |
|---|---|---|---|
| 6,021,199 A * | 2/2000 | Ishibashi | 380/217 |
| 7,024,500 B2 * | 4/2006 | Ashizaki et al. | 710/65 |
| 2002/0016921 A1 | 2/2002 | Olsen et al. | |
| 2002/0042884 A1 | 4/2002 | Wu et al. | |
| 2002/0073202 A1 | 6/2002 | Wang | |
| 2002/0108035 A1 | 8/2002 | Herley et al. | |
| 2002/0184494 A1 * | 12/2002 | Awadalla | 713/160 |
| 2003/0014640 A1 * | 1/2003 | Loyd | 713/182 |
| 2004/0109567 A1 * | 6/2004 | Yang et al. | 380/277 |

* cited by examiner

*Primary Examiner*—Brandon S Hoffman
(74) *Attorney, Agent, or Firm*—David C Ripma; Jon M. Dickinson; Robert D. Varitz

(57) ABSTRACT

A method for segmentedly encrypting the data in a document print job in a manner which preserves options for post-rendering analysis/processing of selected non-content components, and a print job which comes into existence as a consequence of implementation of this method. The method includes identifying and individuating, within such a job, the content commands as distinguished from the non-content commands, and then, as a consequence of such identifying and individuating, encrypting only data contained within the content commands. In one manner of practicing the invention, all data in the content commands is encrypted. In another manner of such practice, only data which is contained within the content-field portions of the content commands is encrypted. The resulting print job, in one form, is characterized with (a) an encrypted part which includes only data contained within content commands, and (b) a non-encrypted part which includes the balance of data contained within the job. In another form, the resulting job is encrypted only with respect to content-field portions of the content commands.

2 Claims, 3 Drawing Sheets

```

...

```

↓

```

...

<encrypted page data A>

<encrypted page data C>

```

*Form 1: Explicit Delimitation*
`<opcode><value><delimiter>`

*Form 2: Implicit Delimitation*
`<opcode><delimitation info><value>`

↓

`<opcode><encrypted value><delimiter>`

`<opcode><delimitation info><encrypted value>`

SEGMENTED, ENCRYPTED PDL FOR POST-RENDERING ANALYSIS

BACKGROUND AND SUMMARY OF THE INVENTION

The present invention relates to document print job encryption, and in particular, to a method, and to a print job data file resulting from implementation of that method, whereby post-rendering analyses of the job's encrypted print stream can take place without revealing the substantive content of the print job per se.

Typically, a document print job is secured by encrypting the related PDL data such that if it is intercepted, as it may be, between the host and the intended recipient printing (imaging) device, it cannot be interpreted, viewed or printed in any unauthorized manner. However, it is also typical that the manner in which such PDL data is encrypted results in an attempted post-rendering analysis process, such as a process involving job auditing, job accounting, and job splitting, failing because of the fact that the analysis process itself, in order to succeed, needs to have access to certain non-substantive content data which it cannot get because of the overall and generalized encryption which has previously taken place.

Various approaches to encryption so far have not offered a satisfactory way to assure secure encryption only of substantive content materials, while leaving other print job data file information generally accessible for post-rendering analyses of the types generally suggested above, as well as others.

The present invention addresses this issue in a very complete and satisfactory way by proposing an encryption methodology whereby a document print job data stream is segmented appropriately to allow for encryption to take place at essentially all regions other than those which preferably should remain accessible for various post-rendering processes/analyses. Fundamentally, practice of the present invention, in its preferred and best-mode form, features a method for encrypting a document print job including the steps of (a) identifying and individuating, within such a job, the so-called content commands as distinguished from the non-content commands associated with the job, and (b) as a consequence of that identifying and individuating practice, encrypting only data that is contained within the content commands. This approach will, in most instances, yield an encrypted print job data stream whose relevant non-substantive contents will be fully accessible and available for all expected post-rendering processes and analyses.

Another approach to implementing the invention, which deals with a document print job data stream with an even smaller, or finer, degree of treatment granularity, involves recognizing that the content commands themselves typically include both non-content fields and content fields. In this practice of the invention, encryption only takes place with respect to such content fields, thus leaving the remainder of the entirety of the associated print job data stream accessible to post-rendering processes and analyses.

Provided immediately below is a hierarchical, textual representation of the typical architecture of a document print-job in relation to the make-up of page instructions for a given page in the associated document.

I. Page Instructions
   A. Non-content commands—no ink-on-paper
   B. Content commands—ink-on-paper
     (1) Non-content fields
     (2) Content fields Page non-content commands do not cause "ink-on-paper". Typical of such commands are (a) the number of copies per page, (b) page orientation, (c) cursor position, and (d) pen color. Page content commands do cause ink-on-paper, and include, as above indicated, both non-content fields and content fields. Illustrations of non-content fields include (a) command opcode, (b) length of command operand, and (c) command delimiter. An illustration of a content field is a command operand itself.

The above-mentioned and other features and advantages of the present invention will become more fully apparent as the detailed description below is read in conjunction with the accompanying drawings.

DESCRIPTION OF THE DRAWINGS

FIG. 6 presents an algorithmic illustration of practice of the invention as pictured in FIG. 2.

FIG. 7 presents a similar illustration of practice of the invention as pictured in FIG. 4.

DETAILED DESCRIPTION OF THE INVENTION

Figure 1:
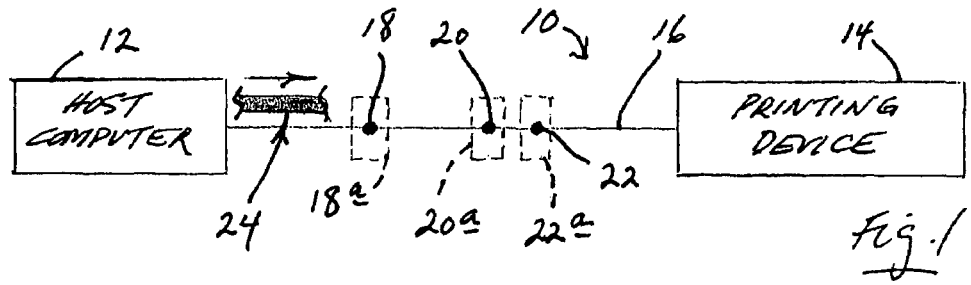
FIG. 1 is a block/schematic diagram generally illustrating a document printing (or imaging) environment wherein a document print job data stream is encrypted, in accordance with practice of the present invention, to protect the security of the substantive content contained within the relevant data stream, without that encryption blocking access to various post-rendering processes and analyses.

Turning now to the drawings, and referring first of all to FIG. 1, indicated generally at 10 is a document printing environment including a host computer 12 and an intended recipient printer, or printing (imaging) device, 14. A suitable communication interconnection 16 extends between host 12 and printer 14, and this interconnection might be, as an illustration, a local network. The nature of this communication path is not important to an understanding of the invention.

Represented by three darkened dots 18, 20, 22 along the length of path 16 between host 12 and printer 14 are three nodes at whose locations, figuratively speaking, several post-rendering analyses processes, like those which were mentioned earlier herein, are staged for activity. With regard to nodes 18, 20, 22, the respective associated processes are represented in a stylized way by dashed-line rectangles 18*a*, 20*a*, 22*a*, respectively.

Within environment 10, it is desired to transmit a document print job in a data stream, shown fragmentarily at 24 in FIG. 1, which is encrypted in such a fashion that an authorized exposure and access to substantive document content cannot take place. Data stream 24 has been rendered in computer 12 for compatibility with printer 14. Very specifically, it is desired that while such encryption is in fact in place with respect to print job 24, the data stream making up that print job, as it engages nodes 18, 20, 22, can nevertheless be subjected to post-rendering analyses, etc. activities by processes 18a, 20a, 22a, respectively. In order that this can take place, it will be necessary that the data information required by these nodes not be hidden behind a wall of encryption, and yet not be enabling for post-rendering access in a manner which simultaneously, and undesirably, exposes substantive document content contained within job 24.

Figure 2:
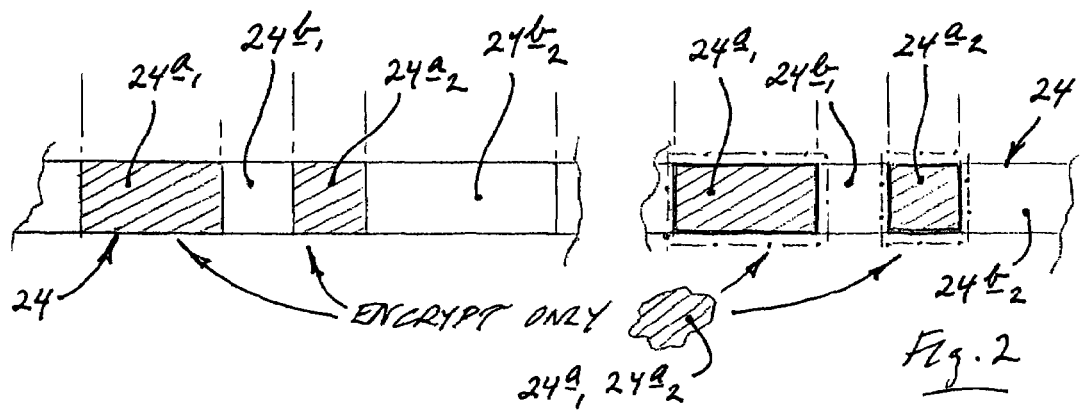
FIG. 2 is a stylized diagram generally illustrating pictorially the preferred and best mode embodiment and practice of the present invention, which practice yields a protected and encrypted print job data stream at a level wherein all print-job content commands are encrypted.
Figure 3:
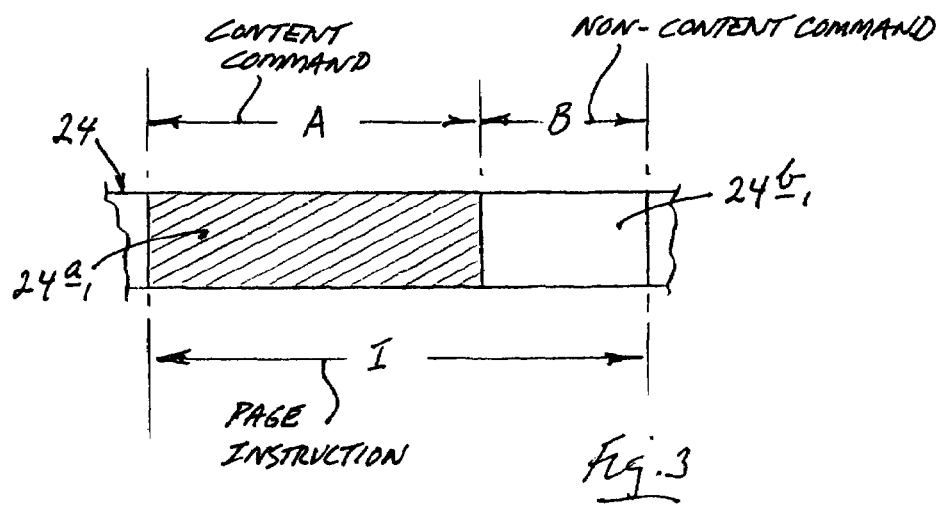
FIG. 3 isolates a portion of FIG. 2, and illustrates the content-command/non-content-command architecture of the print job data stream shown in FIG. 2.

FIG. 2 in the drawings, which should now be read along with FIGS. 3 and 6, illustrates the preferred and best-mode manner of practicing the present invention so as to create an encrypted data stream as a product of practice of the method of the invention, wherein content is secured, and yet other information required by processes 18a, 20a, 22a is nonetheless available. In this illustration of the invention, an assumption is made that processes 18a, 20a, 22a do not need access to any information contained in a print job's content commands. Hence, complete encryption of such content commands will not interfere with any of these three processes.

In FIG. 2, a fragment of print job 24 is shown including four visually distinguished and labeled regions, two of which, shaded regions $24a_1$ $24a_2$, represent ink-on-paper page content commands which are associated, respectively, with two non-ink-on-paper page non-content commands $24b_1$, $24b_2$, respectively. Regions 24a, and 24b, collectively make up one full page instruction. Similarly, regions $24a_2$ and $24b_2$ make up another full page instruction. Enlarged, fragmentary FIG. 3 illustrates in a somewhat more explicit way how regions $24b_1$, $24b_2$ in data stream 24 fit the hierarchical architecture of page instructions set forth above herein.

Under circumstances where complete encryption only of components $24a_1$, and $24b_1$ will nevertheless leave accessible, in components $24b_1$, $24b_2$, all information required by processes 18a, 20a, 22a (the assumption just stated above), then practice of the preferred mode of this invention which implements encryption only of such page content commands, $24a_1$, $24a_2$, will accomplish the key objective of this invention, which is to insure protected encryption of substantive document content, without interfering with the capability for processes 18a, 20a, 22a to perform post-rendering processing and analyses. Accordingly, practice of the invention as illustrated in FIG. 2, involves performing encryption only with respect to regions $24a_1$, $24b_1$, thus to yield an encrypted data stream, represented pictorially at the right side of FIG. 2, with regions $24a_1$, $24b_1$ shown surrounded by dash-dot lines.

A reading now of the statements set forth in FIG. 6 will provide an algorithmic expression of this preferred-mode practice of the invention.

Figure 4:
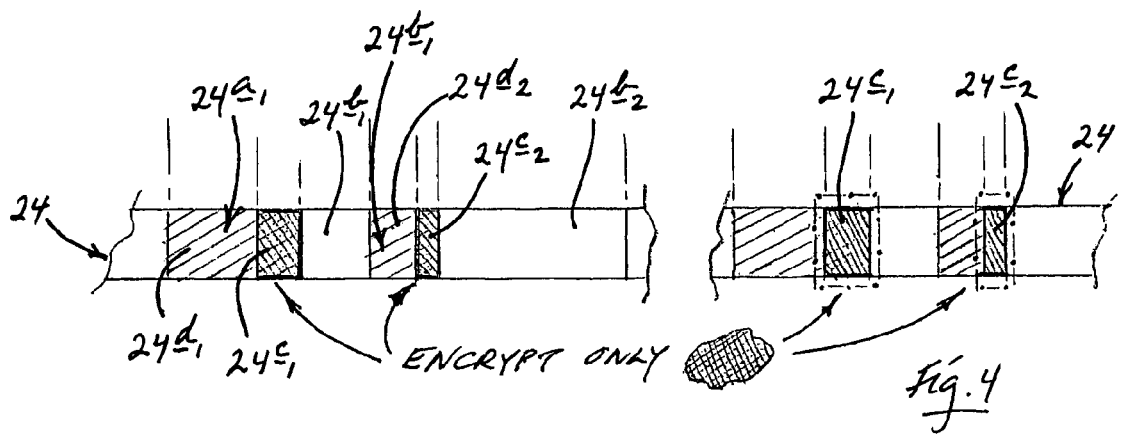
FIG. 4 is similar to FIG. 2, except that this figure illustrates a modified form of the invention—the above-referred-to finer granularity form of the invention—wherein only the content-field portions of content commands in a print-job data stream are encrypted.
Figure 5:
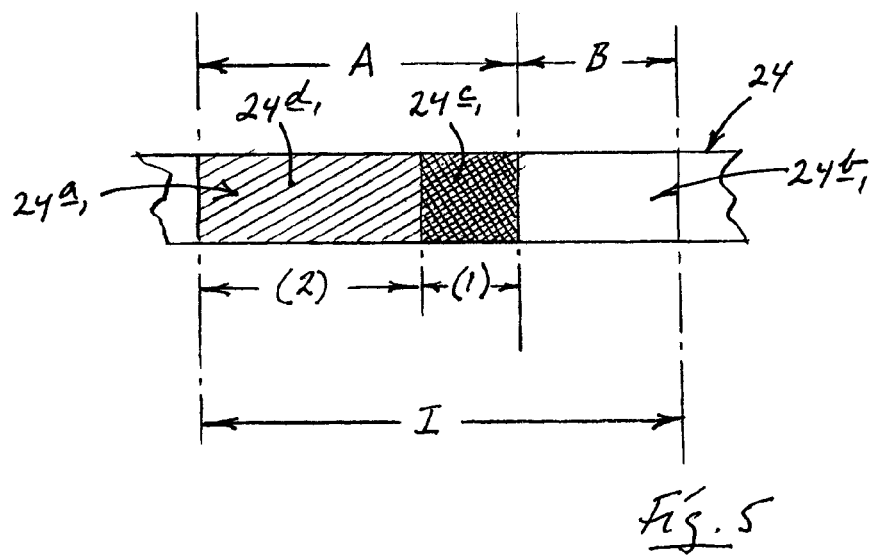
FIG. 5 isolates a portion of FIG. 4, and illustrates the content-field/non-content-field architecture of one of the content commands shown in FIG. 4.

In another approach to practicing this invention, under circumstances where certain portions (content-field portions) within the content commands, such as portions within commands $24a_1$, $24b_1$, need to be available for post-rendering analyses, a modified form of the invention is implemented. This practice form is illustrated in FIGS. 4, 5 and 7. According to this modified form of the invention, a further identification and individuation of portions within print job 24 takes place, whereby, within the respective content commands, content fields are differentiated from non-content fields, and encryption is performed only with respect to the finer-granularity content fields. This is clearly shown pictorially in FIGS. 4 and 5, and is described in algorithmic statements presented in FIG. 7.

In FIGS. 4 and 5, this finer degree of segmentation-granularity is shown by illustrations which individuate the content-field and non-contact-field portions of content commands $24a_1$, $24a_2$. The content-field portions within commands $24a_1$, $24a_2$ are shown, respectively, at $24c_1$, $24c_2$, and the non-content-field portions are pictured, respectively, at $24d_1$, $24d_2$.

As is true in FIG. 2, the encrypted portions here are shown surrounded by dash-dot lines on the right side of FIG. 4. FIG. 5 relates to FIG. 4 in the same manner that FIG. 3 relates to FIG. 2.

Thus a preferred manner of practicing the invention, and one modified form thereof, are fully described and illustrated. The unique, resulting encrypted print jobs are clearly pictured at the right sides of FIGS. 2 and 4. These two encrypted jobs differ with regard to the granularity of segmented encryption. Other modifications and variations may come to the minds of those skilled in the art, and these can certainly be introduced and employed without departing from the spirit of the invention.

The invention claimed is:

1. A method for segmentedly encrypting data in a document print where (a) the print-job data includes both content commands and non-content commands which are segmentable, and (b) the content commands include both content-field and non-content-field portions which are also segmentable, said method comprising identifying and individuating by segmenting within such job data the content commands relative to the non-content commands, identifying and individuating by segmenting, within such content commands, the content-field portions relative to the non-content-field portions, following said identifying and individuating by segmenting, encrypting only the content-field portions of the data contained within the content commands, and thereby preserving options for post-rendering analysis/processing regarding data contained in the non-content commands and in the non-content field portions of the content commands.

2. A segmentedly encrypted document print job, including content commands possessing data-containing, segmentable, content-field portions, and comprising an encrypted part which includes only data contained within the mentioned, segmentable content-field portions of content commands, and a non-encrypted part which includes the balance of data contained within the job relevant to options for post-rendering analysis/processing.

\* \* \* \* \*